(12) United States Patent
Hikichi

(10) Patent No.: US 12,177,398 B2
(45) Date of Patent: Dec. 24, 2024

(54) IMAGE FORMING APPARATUS, AND METHOD FOR CONTROLLING IMAGE FORMING APPARATUS, THAT EXECUTES AN OPERATION OR OPERATIONS AFTER A CHANGE IN POWER STATE OF THE IMAGE FORMING APPARATUS

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,463

(22) Filed: Jul. 5, 2023

(65) Prior Publication Data
US 2024/0015256 A1 Jan. 11, 2024

(30) Foreign Application Priority Data
Jul. 6, 2022 (JP) .................................. 2022-108918

(51) Int. Cl.
*H04N 1/00* (2006.01)
*H04N 1/23* (2006.01)

(52) U.S. Cl.
CPC ....... *H04N 1/00891* (2013.01); *H04N 1/2392* (2013.01)

(58) Field of Classification Search
None
See application file for complete search history.

(56) References Cited

U.S. PATENT DOCUMENTS 9,654,659 B2 * 5/2017 Hikichi ............. H04N 1/00901
2013/0201516 A1 * 8/2013 Ito ..................... H04N 1/00891
358/1.14

FOREIGN PATENT DOCUMENTS

JP 2012192638 A 10/2012

\* cited by examiner

*Primary Examiner* — Thomas D Lee
(74) *Attorney, Agent, or Firm* — Canon U.S.A., Inc. IP Division

(57) ABSTRACT

An image forming apparatus has a first power state and a second power state lower in power than the first power state, the operation unit being turned off in the second power state. The image forming apparatus includes a display control unit configured to control a display on an operation unit, a reception unit configured to receive an end notification for end processing of the image forming apparatus, and a processing unit configured to perform, in response to receipt of the end notification by the reception unit, the end processing of the image forming apparatus, wherein, in response to receipt of the end notification by the reception unit when the image forming apparatus is in the second power state in which the operation unit is turned off, the display control unit turns on the operation unit.

14 Claims, 7 Drawing Sheets

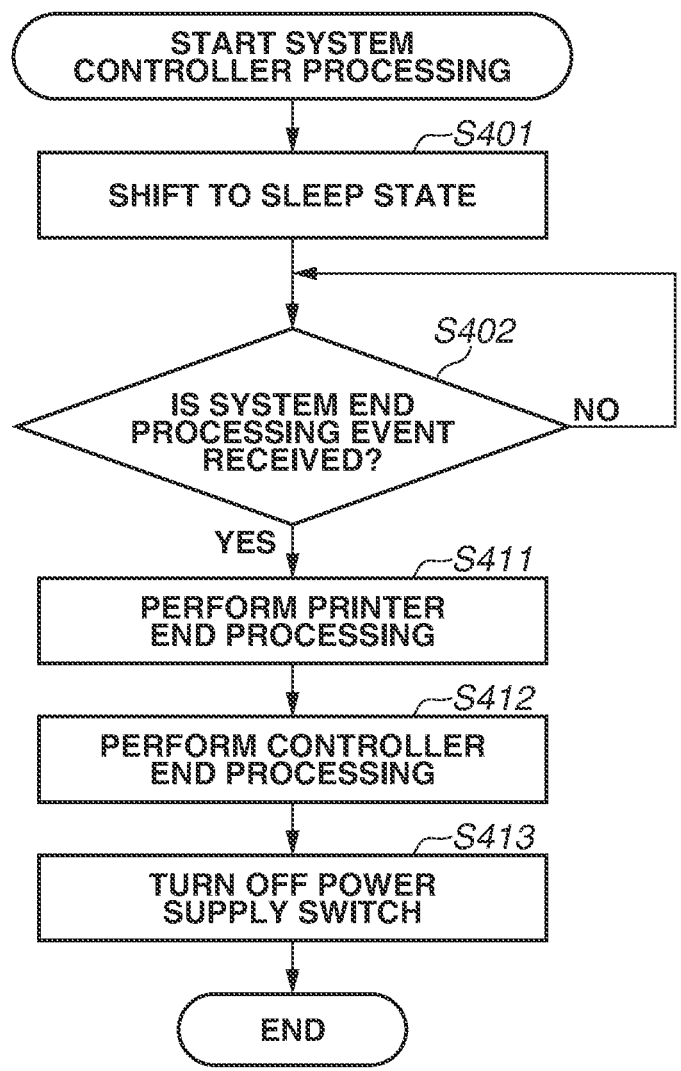

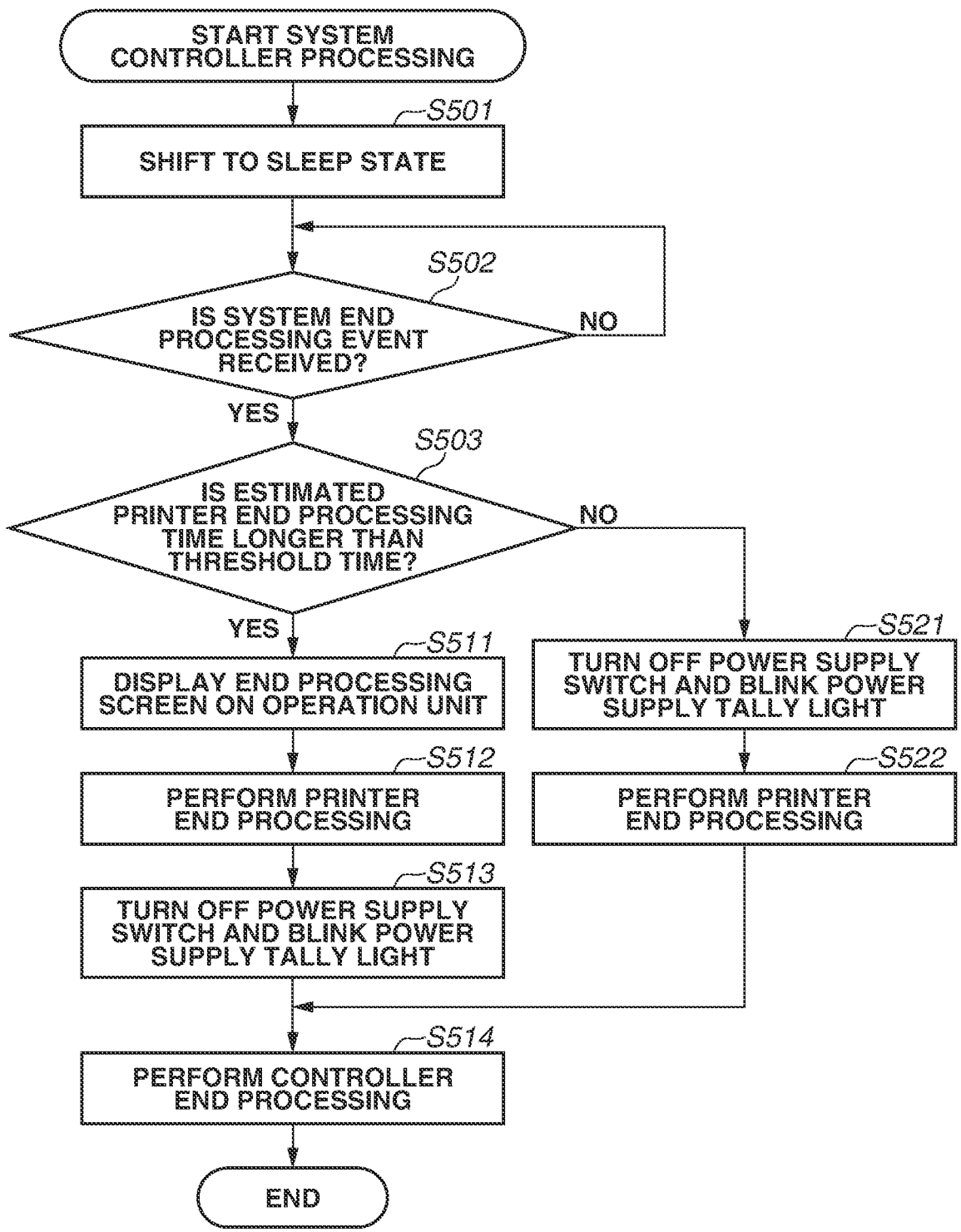

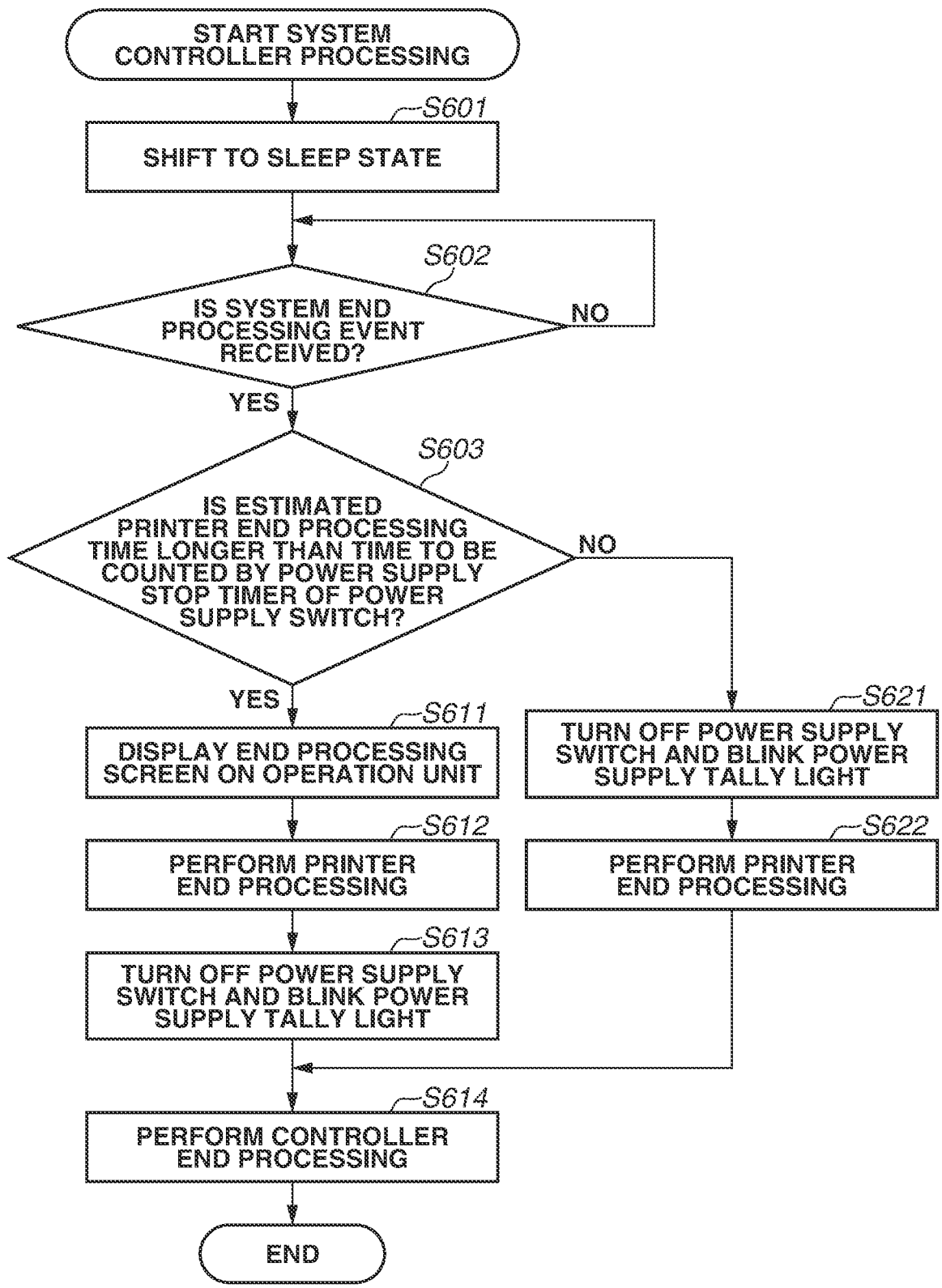

IMAGE FORMING APPARATUS, AND METHOD FOR CONTROLLING IMAGE FORMING APPARATUS, THAT EXECUTES AN OPERATION OR OPERATIONS AFTER A CHANGE IN POWER STATE OF THE IMAGE FORMING APPARATUS

BACKGROUND

Field

The present disclosure relates to an image forming apparatus and a method for controlling the image forming apparatus.

Description of the Related Art

Image forming apparatuses have, as their power states, an active state and a sleep state.

The active state is a high-power standby state in which power is supplied to a printer and a scanner as needed to cause the image forming apparatus to stand ready to copy and the like. The sleep state is a low-power standby state in which no power is supplied to the printer and the scanner depending on the situation and a user interface (UI) screen stops displaying and is turned off. The image forming apparatus shifts from the active state to the sleep state in response to receipt of a power saving event, such as a press of a power saving key or expiration of a sleep timer.

In addition to the active state and the sleep state, image forming apparatuses have an end state. When shifting to the end state, the image forming apparatus performs end processing, such as printer end processing and logic data storing, for device protection and data protection.

Turning off of a power supply switch by a user or receipt of a system end processing triggers the image forming apparatus to start a shutdown, which is a type of end processing. The image forming apparatus displays, on a UI panel, information indicating that the shutdown is in progress, or blinks a power supply tally light, to notify the user that the system end processing is in progress. Japanese Patent Application Laid-Open No. 2012-192638 discusses a technique in which, in response to a press of a power supply switch, a power supply to each apparatus component is disconnected and a UI displays information indicating that processing for the power supply disconnection is in progress, and then after completion of data protection, a main power supply is disconnected.

SUMMARY

According to one embodiment of the present disclosure, an image forming apparatus has a first power state and a second power state lower in power than the first power state, the operation unit being turned off in the second power state. The image forming apparatus includes a display control unit configured to control a display on an operation unit, a reception unit configured to receive an end notification for end processing of the image forming apparatus, and a processing unit configured to perform, in response to receipt of the end notification by the reception unit, the end processing of the image forming apparatus, wherein, in response to receipt of the end notification by the reception unit when the image forming apparatus is in the second power state in which the operation unit is turned off, the display control unit turns on the operation unit.

Further features of the present disclosure will become apparent from the following description of exemplary embodiments with reference to the attached drawings.

BRIEF DESCRIPTION OF THE DRAWINGS

FIG. 5 is an example of a flowchart illustrating conventional end processing.

FIG. 6 is an example of a flowchart illustrating end processing according to a first exemplary embodiment.

FIG. 7 is an example of a flowchart according to a second exemplary embodiment.

DESCRIPTION OF THE EMBODIMENTS

In a case where printer end processing involves a lengthy period operation, a performance time of the end processing by an image forming apparatus increases. The performance time of the printer end processing sometimes continues for about an hour. In a case where such a lengthy period is taken for the printer end processing and when a power supply switch of the image forming apparatus is turned off, a power supply stop timer of the power supply switch may expire before completion of the printer end processing, and the power supply may be stopped during the printer end processing. Thus, in a case where a system end processing event is received, the printer end processing is performed without turning off the power supply switch. After completion of the printer end processing, the power supply switch is turned off, and controller end processing is performed. During the controller end processing, a notification indicating that the controller end processing is in progress is notified to a user with a tally light started to blink in response to the power supply switch being turned off.

In the above-described case, the image forming apparatus is in an active state, and when performing a system end processing event, the image forming apparatus can display an end processing screen because an operation unit is turned on before the start of the system end processing event. On the other hand, in a case where the image forming apparatus performs the system end processing event in a sleep state, the image forming apparatus is not able to display the end processing screen because the operation unit is turned off before the start of the system end processing event. Furthermore, in a case where a lengthy period is taken for the printer end processing, blinking of the tally light is not even performed during the printer end processing since the power supply switch is not turned off, the user cannot be notified that the end processing is in progress.

As described above, the image forming apparatus has an issue that even when the image forming apparatus has received a system end processing event in the sleep state, the image forming apparatus cannot notify the user that end processing is in progress during a lengthy period of printer end processing. Various embodiments of the present disclosure are directed to solving the above-described issue. Various embodiments of the present disclosure are directed to providing a system for notifying a user that end processing is in progress in a case where a system end processing event is received in a sleep state.

Various exemplary embodiments of the present disclosure will be described below with reference to the drawings.

<Configuration of System>

Figure 1:
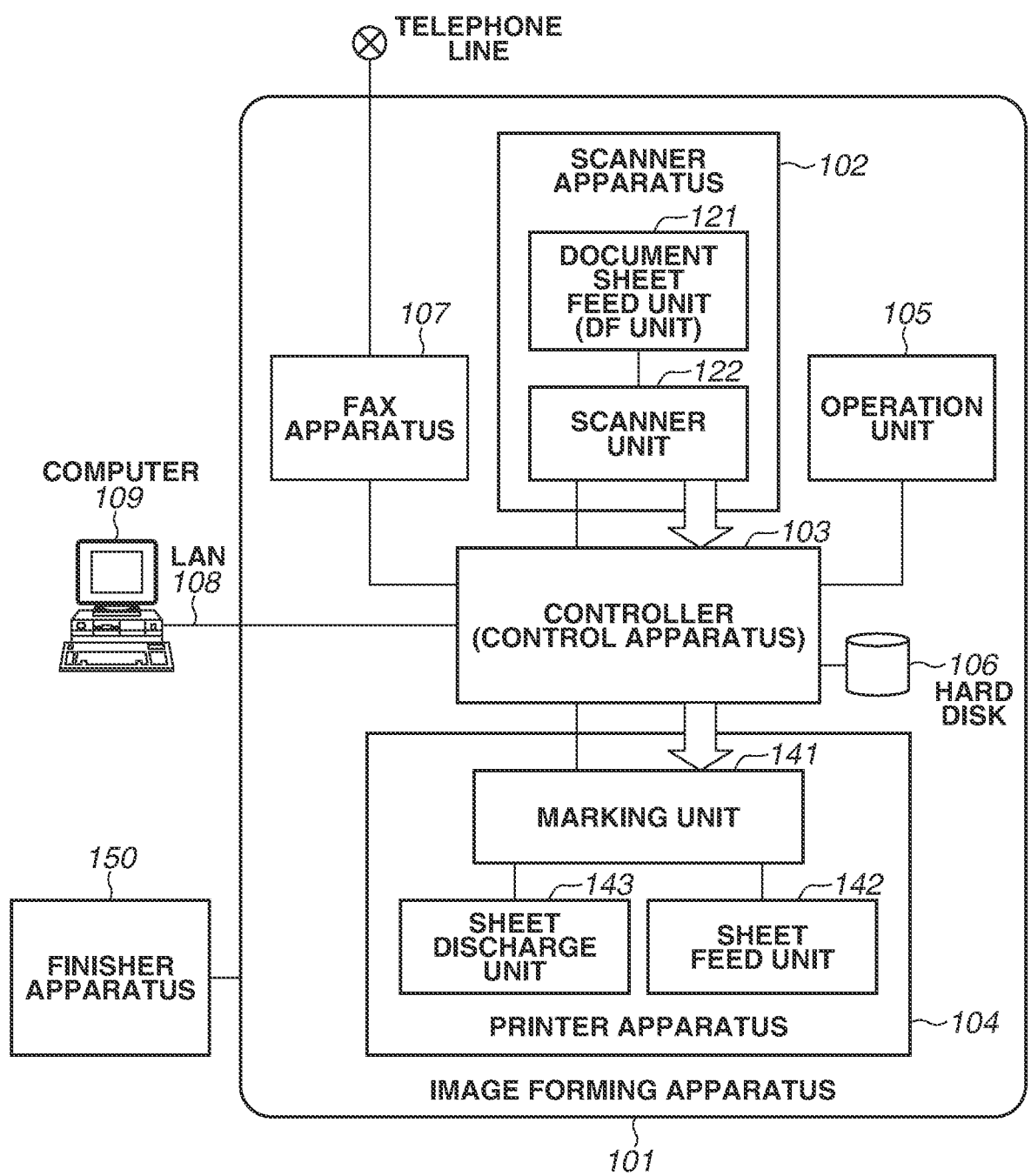
FIG. 1 is an example of a block diagram illustrating an image forming apparatus.

FIG. 1 is a block diagram illustrating a configuration of an image forming system according to a first exemplary embodiment. A multi-function peripheral with a print function, a scanner function, and a data communication function will be used as an example in the below description.

In FIG. 1, an image forming apparatus 101 is configured to receive jobs from a computer 109 via a local area network (LAN) 108. The number of computers connected to the image forming apparatus 101 can be one or more than one. A scanner apparatus 102 optically scans images from documents and converts the images into digital images. A printer apparatus 104 outputs the digital images to paper medium referred to as sheets. The printer apparatus 104 is also referred to as a printer unit. An operation unit 105 includes a touch panel and hardware keys for receiving settings for the image forming apparatus 101 from a user and for displaying processing states. A hard disk (also referred to as hard disc drive (HDD)) 106 stores digital images and control programs. The HDD 106 is a non-volatile storage apparatus and can be a solid state drive (SSD) or an embedded multimedia card (eMMC). A fax apparatus 107 transmits and receives digital images to and from a telephone line. A controller (control apparatus) 103 is connected to the scanner apparatus 102, the printer apparatus 104, the operation unit 105, the HDD 106, and the fax apparatus 107, and executes jobs on the image forming apparatus 101 by issuing instructions to the foregoing modules.

Instructions to input/output a digital image, jobs, and instructions for devices can be issued from the computer 109 to the image forming apparatus 101 via the LAN 108. The scanner apparatus 102 includes a document sheet feed unit (DF unit) 121 and a scanner unit 122. The document sheet feed unit 121 is capable of sequentially replacing a stack of documents automatically. The scanner unit 122 is capable of optically scanning a document and converting the scanned document into a digital image. The converted image data is transmitted to the controller 103.

The printer apparatus 104 includes a sheet feed unit 142, a marking unit 141, and a sheet discharge unit 143. The sheet feed unit 142 is capable of sequentially feeding sheets one by one from a stack of sheets. The marking unit 141 prints image data on a fed sheet. The sheet discharge unit 143 discharges the printed sheet. A finisher apparatus 150 performs processing, such as sheet discharging, sorting, stapling, punching, and/or cutting on paper medium output from the sheet discharge unit 143 of the printer apparatus 104 of the image forming apparatus 101.

<Functions of System>

Examples of jobs (functions) that the image forming apparatus 101 can perform will be described below.

(Copy Function)

The image forming apparatus 101 has a copy function of recording an image read with the scanner apparatus 102 on the HDD 106 while performing printing using the printer apparatus 104.

(Image Transmission Function)

The image forming apparatus 101 has an image transmission function of transmitting an image read with the scanner apparatus 102 to the computer 109 via the LAN 108.

(Image Storage Function)

The image forming apparatus 101 has an image storage function of recording an image read with the scanner apparatus 102 on the HDD 106 and transmitting and/or printing the image as needed.

(Image Printing Function)

The image forming apparatus 101 has an image printing function of analyzing, for example, a page description language transmitted from the computer 109 and performing printing.

<Configuration of Operation Unit 105>

Figure 2:
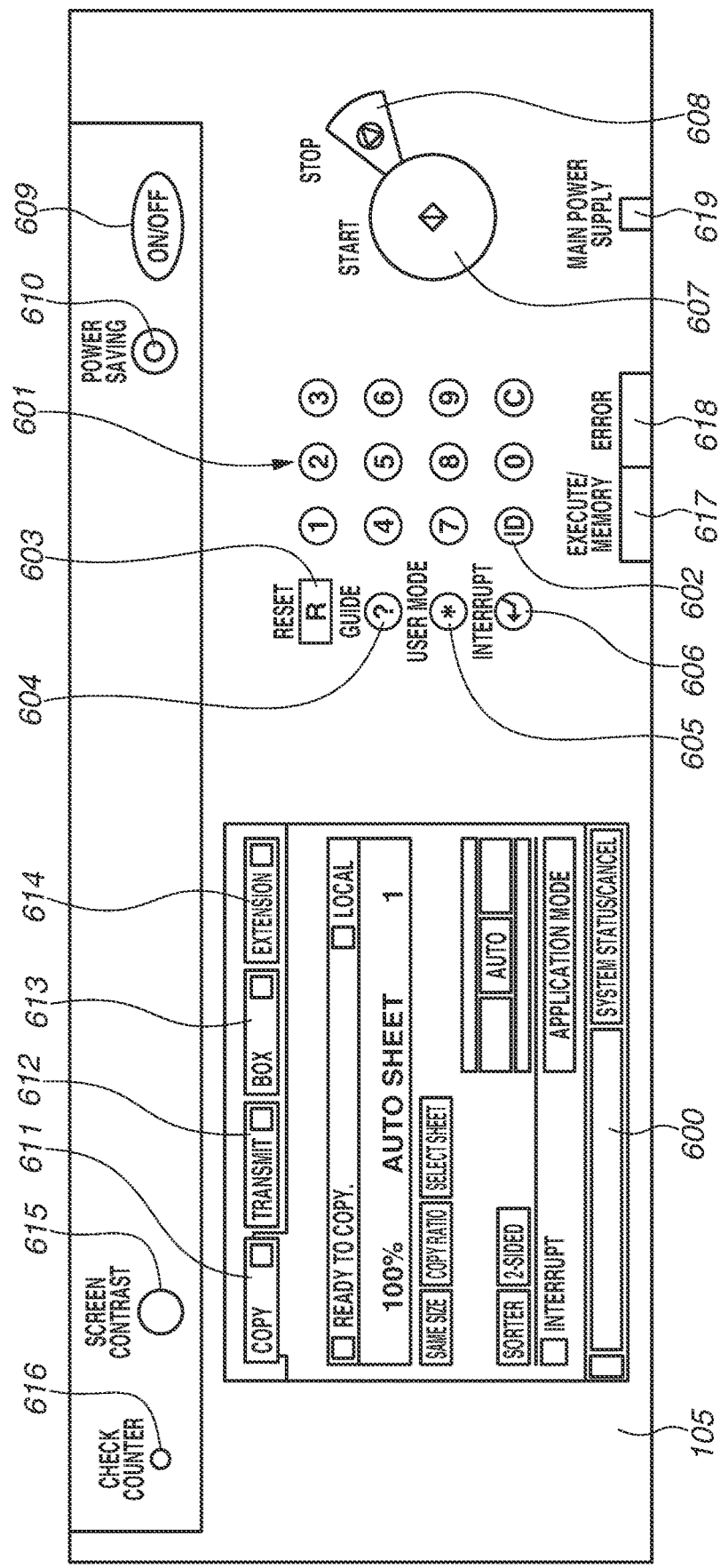
FIG. 2 is an example of a block diagram illustrating an operation unit.

The operation unit 105 will be described below with reference to FIG. 2.

The operation unit 105 is connected to the controller 103 and provides a user interface for operation of the image forming apparatus 101. The user interface includes a liquid crystal display (LCD) touch panel 600, a power saving key 610, start key 607, a stop key 608, a reset key 603, a numeric keypad 601, a user mode key 605, and a power supply tally light 619.

The LCD touch panel 600 on which main mode setting is set and a status is displayed includes a backlight that can be turned on/off. The LCD touch panel 600 is also referred to an operation panel. The controller 103 as a display control unit controls the turning on/off of the backlight. The numeric keypad 601 is used to input numeric values of 0 to 9. An identification (ID) key 602 is used to input a department number and a passcode in a case where the image forming apparatus 101 is managed by a department.

The reset key 603 is used to reset a set mode. A guide key 604 is used to display a screen for details of each mode. The user mode key 605 is used to display a user mode screen. An interrupt key 606 is used to interrupt a job and perform copying.

The start key 607 is used to start a copy operation. The stop key 608 is used to stop an in-progress copy job.

In response to a press of a software power supply switch 609, power supply control, power saving control, and sleep control are performed. In response to a press of the power saving key 610, the image forming apparatus 101 shifts to the sleep state and turns off the backlight of the LCD touch panel 600, and in response to another press of the power saving key 610, the image forming apparatus 101 recovers from the sleep state and turns on the backlight of the LCD touch panel 600. The software power supply switch 609 and the power saving key 610 can be combined into a single switch, and a press of the single switch can cause the image forming apparatus 101 to shift to or recover from the sleep state.

A copy function key 611, a transmission function key 612, a box function key 613, and an extension function key 614 are used for transition to respective function screens. The box function key 613 displays a function screen for storing an image in the HDD 106. The LCD touch panel 600 illustrated in FIG. 2 displays a standard screen of the copy function key 611, and in response to a press of another function key from among the transmission function key 612, the box function key 613, and the extension function key 614, a standard screen corresponding to the pressed function key is displayed.

An adjustment key 615 is used for adjustment of a screen contrast of the LCD touch panel 600. A check counter key 616 displays a count screen that displays a result of counting the number of copies or printed sheets that have been used.

A job tally light 617 has LED blinking patterns and colors each of which indicates a different state, for example, that a job is in progress or image storing in an image memory is in progress. An error tally light 618 has LED blinking patterns and colors each of which indicates a different error state of the image forming apparatus 101, for example, that a sheet is jammed or a door is opened. The power supply tally light 619 has LED blinking patterns and colors each of which indicates a different state, for example, that a main power supply switch of the image forming apparatus 101 is on/off, or state shifting is in progress.

The foregoing keys can be realized by hardware keys or software keys displayed on the LCD touch panel 600. Even though the hardware can be omitted, such a configuration is not relevant here and thus the description is omitted.

<Block Diagram of Controller 103>

Next, a block diagram of the controller 103 and peripheral apparatuses will be described below with reference to FIG. 3. The controller 103 includes a main board 200 and a sub-board 220.

The main board 200 is a general-purpose central processing unit (general-purpose CPU) system. The main board 200 includes a central processing unit (CPU) 340, a boot read-only memory (boot ROM) 202, a memory 341, a bus controller 204, and a non-volatile memory 205. The CPU 340 controls entire operation of the main board 200. The boot ROM 202 stores a boot program. The memory 341 is used as a work memory by the CPU 340. The bus controller 204 has a bridge function for connecting to an external bus. Data stored in the non-volatile memory 205 is not lost when the power is turned off. The CPU 340 controls a watchdog timer 230 (also referred to as "WDT") configured to reset the controller 103.

The CPU 340 controls a network controller 211 to transmit and receive data to and from the computer 109 via the LAN 108. The CPU 340 controls a real time controller (RTC) 212 to set current time and recovery time. The main board 200 further includes a disk controller 206, a flash disk 207, and a universal serial bus (USB) controller 208. The disk controller 206 controls storage devices. The flash disk 207 is a relatively-small-capacity storage device including a semiconductor device, such as a SSD or an eMMC. The USB controller 208 is capable of controlling USBs. External devices, such as a USB memory 209, the operation unit 105, and the HDD 106 are connected to the main board 200.

The sub-board 220 includes a relatively small general purpose CPU system and image processing hardware. The sub-board 220 includes a CPU 221, a memory 223, a bus controller 224, and a non-volatile memory 225. The CPU 221 controls entire operation of the sub-board 220. The memory 223 is used as a work memory by the CPU 221. The bus controller 224 has a bridge function for connecting to an external bus. Data stored in the non-volatile memory 225 is not lost when the power is turned off. The sub-board 220 further includes an image processor 227 and device controllers 226. The image processor 227 performs real-time digital image processing. The scanner apparatus 102 and the printer apparatus 104 connected externally to the controller 103 transmit and receive digital image data via the device controllers 226. Paper medium discharged from the printer apparatus 104 are processed by the finisher apparatus 150. The fax apparatus 107 is controlled directly by the CPU 221.

Figure 3:
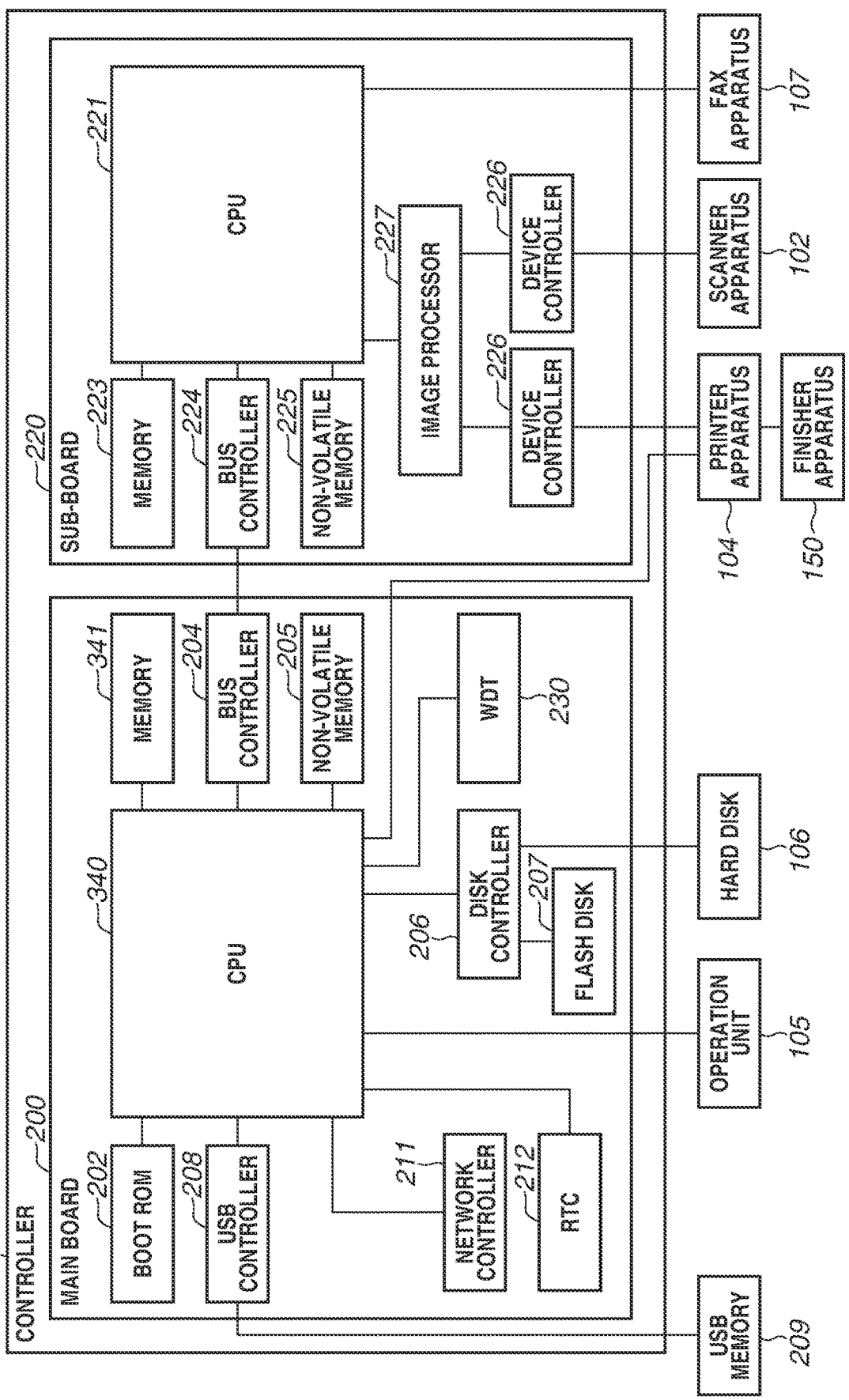
FIG. 3 is an example of a block diagram illustrating a controller.

FIG. 3 is a simplified block diagram. While the CPUs 340 and 221 include many pieces of CPU peripheral hardware, such as chip sets, bus bridges, and clock generators, other than the illustrated components, the description is simplified because the detailed description is unnecessary from the point of view of a simplification of the description. This block configuration is not intended to limit the present invention.

Operations of the controller 103 in copying an image on a paper medium will be described below as an example. In a case where a user issues an instruction to copy an image from the operation unit 105, the CPU 340 transmits an instruction to read an image to the scanner apparatus 102 via the CPU 221. The scanner apparatus 102 optically scans a paper document, converts the scanned document into digital image data, and inputs the converted digital image data to the image processor 227 via the device controller 226. The image processor 227 temporarily stores the digital image data in the memory 223 by direct memory access (DMA) transfer via the CPU 221.

In a case where the CPU 340 determines that a predetermined amount of digital image data or entire digital image data is stored in the memory 223, the CPU 340 issues an image output instruction to the printer apparatus 104 via the CPU 221.

The CPU 221 notifies the image processor 227 of an address of the image data stored in the memory 223. The image data stored in the memory 223 is transmitted to the printer apparatus 104 via the image processor 227 and the device controller 226, based on synchronization signals from the printer apparatus 104. The printer apparatus 104 prints the digital image data on a paper medium.

In a case where a plurality of copies is to be printed, the CPU 340 stores the image data stored in the memory 223 in the HDD 106. The second and subsequent copies can be printed based on image data transmitted from the HDD 106 or the memory 223 to the printer apparatus 104, without acquiring the image data from the scanner apparatus 102.

<Power Supply Configuration>

Figure 4:
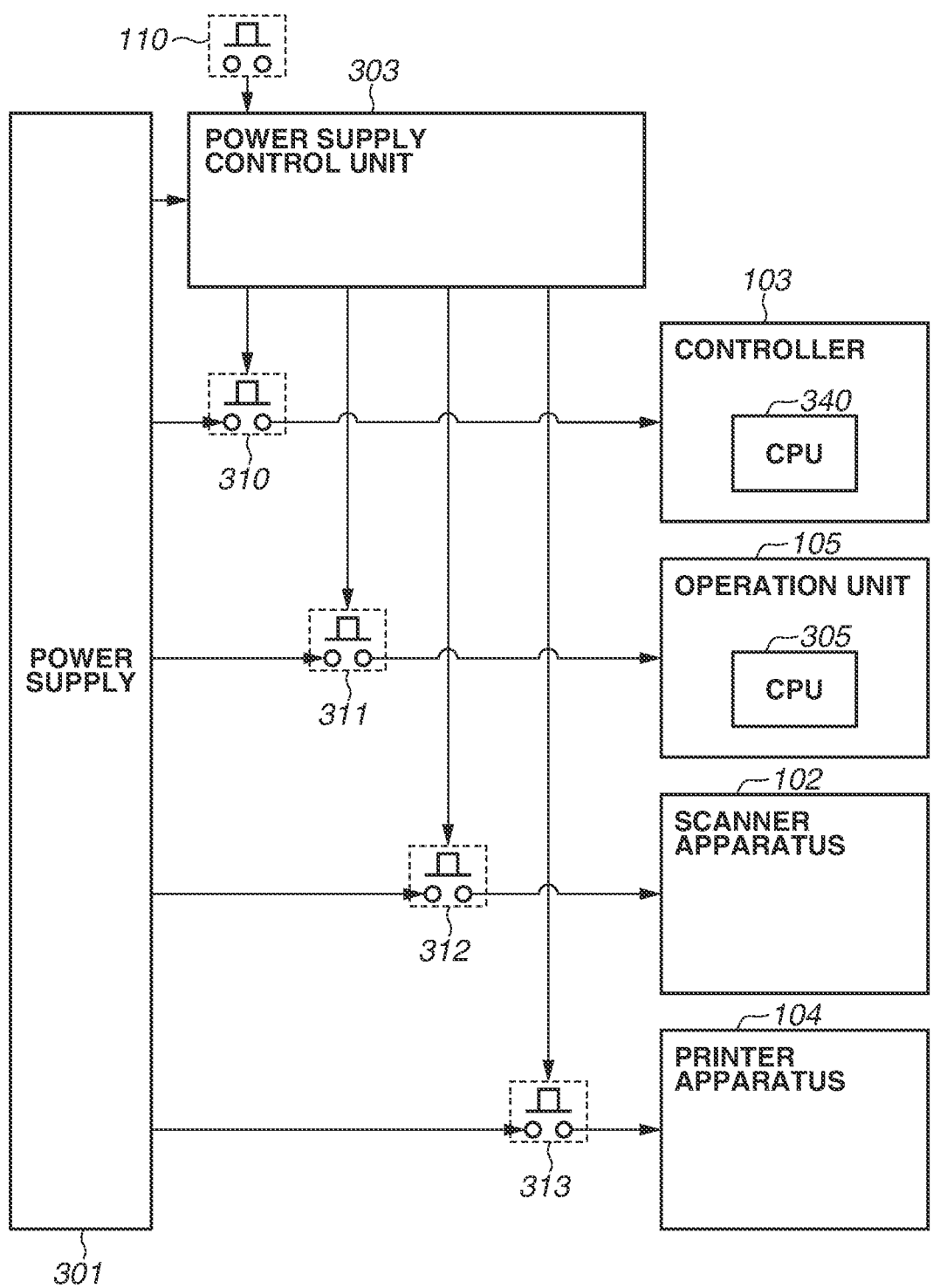
FIG. 4 is an example of a power supply system diagram of the image forming apparatus.

FIG. 4 is a block diagram illustrating a power supply configuration of the image forming apparatus 101 illustrated in FIG. 1. A configuration of a power supply 301, a power supply control unit 303, the controller 103, the operation unit 105, the scanner apparatus 102, and the printer apparatus 104 of the image forming apparatus 101 in accordance with various embodiments of the present disclosure will be described below with reference to FIG. 4.

In FIG. 4, the power supply 301 constantly supplies power to the power supply control unit 303 through a power supply line. Because the power consumption of the power supply control unit 303 is very low, power is supplied only to the power supply control unit 303 in a power off state of the image forming apparatus 101, and power control is performed.

In response to a press of a power supply switch 110 of the image forming apparatus 101, the power supply control unit 303 detects the press, controls a power supply switch (P) 310, and supplies power to the CPU 340 of the controller 103. Similarly, the power supply control unit 303 controls a power supply switch (Q) 311 and supplies power to a CPU 305 of the operation unit 105, controls a power supply switch (R) 312 and supplies power to the scanner apparatus 102, and controls a power supply switch (L) 313 and supplies power to the printer apparatus 104.

The CPU 340 of the controller 103 issues a notification to the power supply control unit 303 to control the power supply switch (Q) 311 and supply power individually to the CPU 305 of the operation unit 105. Simultaneously, the CPU 340 can control the power supply switch (R) 312 and supplies power individually to the scanner apparatus 102 from the power supply 301 and can control the power supply switch (L) 313 and supplies power individually to the printer apparatus 104 from the power supply 301. In this processing, the power supply to the marking unit 141, the sheet feed unit 142, and the sheet discharge unit 143 of the printer apparatus 104 can also be controlled individually, but the description is not relevant here and thus omitted.

The block-by-block power supply as illustrated in FIG. 4 is realized as described below. For example, the power supply switch (P) 310 includes two lines, and in the sleep state, only a relay switch connected to a block for which the power supply is to be turned off is turned off while the other switch remains turned on. In a shutdown state, the relay switches of both lines are turned off. In this case, power supply control signals are not binary, and multi-valued control signals corresponding to the power states are used. While not specified herein, the supply of power in the above-described power states including the sleep state and the shutdown state is realized by the above-described control. The control can be performed such that the power supply control unit 303 supplies power to the blocks of the controller 103 by controlling the power supply switch (P) 310 with multi-value control signals. The control can be performed in any forms including a form in which the CPU 340 of the controller 103 issues a notification to the power supply control unit 303 to control the power supply switch (P) 310 with multi-value control signals to supply power to the blocks of the controller 103.

<Power Supply by Power Supply Control Unit 303 in Shifting to Sleep State>

Next, a process of shifting to the sleep state that is performed by the controller 103 will be described below. In a case where the active state without any user operation continues for a predetermined time, the CPU 340 shifts to the sleep state in accordance with an auto sleep timer. The CPU 340 notifies the power supply control unit 303 of the shifting to the sleep state and changes the power supply to the controller 103. The block-by-block power supply is realized as described above. Specifically, in the sleep state, for example, from among the two lines included in the relay switch, a relay switch connected to a block for which the power supply is to be turned off is turned off while the other switch remains turned on.

In this processing, the CPU 340 can issue a notification to the power supply control unit 303 to shift to the sleep state by turning off the power supply switch (Q) 311 and stopping the power supply from the power supply 301 to the operation unit 105. In this processing, the CPU 340 can also issue a notification to the CPU 305 of the operation unit 105 via serial communication to shift to the sleep state by causing the CPU 305 of the operation unit 105 to control an operation panel and peripherals to shift to the power saving state. Similarly, the scanner apparatus 102 and the printer apparatus 104 can also shifts to the sleep state, however, since this is not relevant here, the description is omitted.

<Power Feeding by Power Supply Control Unit 303 During Sleep State>

Next, the sleep state of the image forming apparatus 101 will be described below. The sleep state is a state where the power consumption is low and time to be taken for activation is short compared to time to be taken for normal activation.

Shifting to the sleep state is performed in a case where a no user operation state is continued for a predetermined time, the LCD touch panel 600 or the power saving key 610 on the operation unit 105 is pressed, or a set time comes. During the sleep state, power is supplied to the memory 341, an interruption controller, the network controller 211, the RTC 212, and the USB controller 208 of the controller 103. Power is also supplied to the power saving key 610 of the operation unit 105, part of the fax apparatus 107, and various sensors. Because different systems have different sleep recovery factors, the power supply in the sleep state is not limited to the above-described configuration.

<Power Supply by Power Supply Control Unit 303 in Recovery from Sleep State>

Operations of software in recovery from the sleep state will be described below. In response to one or more interruptions from a network, the RTC 212 detecting a timer or an alarm, the fax apparatus 107 detecting an incoming call or off-hook, an operation on a software switch, detection by various sensors, and/or the USB memory 209 detecting attachment, removal, or communication during the sleep state, the power supply control unit 303 starts supplying power. More specifically, examples of the one or more interruptions include opening and closing of a cover of a front door of the printer apparatus 104, the insertion and removal of a print sheet from a multi-manual sheet feed unit of the printer apparatus 104, opening and closing of a cover of the scanner apparatus 102, and detection of a document on an auto document feeder of the scanner apparatus 102. Furthermore, examples of the one or more interruptions include detection of a card by a near-field communication (NFC) card reader, detection of a human by a human sensor, off-hook of a fax handset, and receipt of a fax. The power supply control unit 303 notifies the CPU 340 of a cause(s) of the interruption(s), and the CPU 340 having received the notification performs processing to cause the software to recover to a normal state, i.e., sleep recovery processing.

Next, the sleep recovery processing of the controller 103 will be described below. In response to an event handler invoked by a press of a power saving key during the sleep state, which is one of the sleep recovery factors, the power supply control unit 303 turns on the power supply switch (P) 310 and recovers the CPU 340 of the controller 103 from the sleep state. In this processing, for example, the power supply control unit 303 controls the power supply switch (P) 310 with multi-value control signals and supplies power to the blocks of the controller 103. While the power supply control unit 303 can also causes the CPU 340 to recover from the sleep state by issuing an interruption signal to the CPU 340, this sequence is complicated and is not relevant here, and thus the description is omitted. The CPU 340 transmits a notification to the power supply control unit 303, and the power supply control unit 303 turns on the power supply switches (Q) 311, (R) 312, (L) 313 and supplies power to the operation unit 105, the scanner apparatus 102, and the printer apparatus 104. While the power supply to devices, such as the fax apparatus 107, is not illustrated, the power supply can also be performed with not-illustrated signals.

While the above-described sleep recovery factor is a press of the power saving key 610, a recovery from the sleep state can be caused by a network packet, and the network packet can be processed during a sleep intermediate state. In a case where a network packet, which is a sleep recovery factor, is received in the sleep state, the power supply control unit 303 turns on the power supply switch (P) 310 and causes the CPU 340 of the controller 103 to recover from the sleep state. At this time, in a case where it is determined by analysis that the received network packet is a print job, the CPU 340 transmits a notification to the power supply control unit 303, and the power supply control unit 303 turns on the power supply switch (L) 313 and supplies power to the printer apparatus 104. In this case, the processing can be performed without supplying power to the operation unit 105 and the scanner apparatus 102. Specifically, power supply to the operation unit 105 can be skipped in a case where the user does not use the touch panel. Further, power supply to the printer apparatus 104 and the scanner apparatus 102 can also skipped in a case where no print jobs are generated or in a case where device information acquisition is not performed.

<Power Supply by Power Supply Control Unit 303 in Shifting to Sleep State Again>

The CPU 340 shifts to the sleep state again after completion of copying performed by the user or completion of a print job received via the network. Specifically, the CPU 340 transmits a notification of shifting to the sleep state to the power supply control unit 303. The power supply control unit 303 turns off the power supply switches (Q) 311, (R) 312, (L) 313 with power supply control signals and stops the power supply except for the power supply to the controller 103. In this processing, for example, the power supply control unit 303 can cause the CPU 340 to shift to the sleep state by causing the CPU 340 to shift to an interruption signal awaiting state and controlling the power supply switch (P) 310 with multi-value control signals and turning off the blocks of the controller 103. However, this sequence is complicated and is not relevant here, the description is omitted.

<Power Supply by Power Supply Control Unit 303 in Shifting to End State (Description of Conventional Procedure)>

FIG. 5 is a flowchart illustrating a conventional procedure of end processing from the sleep state. FIG. 6 is a flowchart illustrating a procedure of end processing from the sleep state according to the present exemplary embodiment. The flowchart in FIG. 5 is for comparison with the flowchart in FIG. 6.

The flowchart in FIG. 5 will be described below. In step S401, in a case where the user does not perform control for a predetermined time or in a case where the power saving key 610 or a power saving icon is pressed, the CPU 340 shifts from the active state to the sleep state, which is a start of the procedure.

Next, in step S402, the CPU 340 determines whether a system end processing event is received. The system end processing event can be received based on a remote shutdown in which a shutdown event is received from the computer 109 (externally provided) via the LAN 108, a weekly shutdown in which shutdown time for each day of one week is set via the LCD touch panel 600 of the operation unit 105 and a shutdown event is received at the designated time, or an auto-shutdown timer that automatically performs a shutdown in a case where no control is performed by the user for a predetermined time.

In a case where a system end processing event is received (YES in step S402), the processing proceeds to step S411. In step S411, end processing for the printer apparatus 104 is performed. In step S412, end processing for the controller 103 is performed. In step S413, the power supply switch 110 is turned off.

The end processing for the printer apparatus 104 includes fan rotation control for releasing heat to lower the temperature of the printer apparatus 104 and fan control for discharging ozone in the printer apparatus 104. The end processing for the printer apparatus 104 further includes a rotary drum separation operation for preventing image streaks by a rotary drum of the marking unit 141 for image fixing and control for closing a charging shutter to prevent the rotary drum of the marking unit 141 from drying. While the end processing for the printer apparatus 104 is described as processing that is performed as part of shutdown processing started in response to receipt of the end processing event in step S402 according to the present exemplary embodiment, the present exemplary embodiment is not limited to the above described configuration. For example, the end processing for the printer apparatus 104 can be started when shifting from a standby state to the sleep state is performed.

The end processing for the controller 103 includes stopping of job input, a job cancellation, and storing of data from the memory 341 of the controller 103 to the HDD 106. The CPU 340 transmits a notification to the power supply control unit 303, and the power supply control unit 303 supplies power to a solenoid of the power supply switch 110, which is a solenoid-attached seesaw switch, to pull the power supply switch 110 in an off-direction, whereby the power supply switch 110 is turned off. In another method, the CPU 340 transmits a notification to the power supply control unit 303, and the power supply control unit 303 controls the power supply switch 110, which is a tactile switch, to be turned off, whereby the power supply switch 110 is turned off.

In this processing, a display unit of the operation unit 105 is turned off because the procedure is started from the sleep state, and the power supply tally light 619 of the operation unit 105 remains turned on and keeps the blinking pattern because the power supply switch 110 is not turned off, and the end processing is performed. Specifically, in a case where an end processing event is received in the sleep state, although the image forming apparatus 101 is in a state of not being ready to receive job inputs from users, the image forming apparatus 101 cannot display information indicating that system end processing is in progress.

In a case where the power supply switch 110 is turned off, the image forming apparatus 101 awaits end processing for software and hardware, such as the printer apparatus 104 and the scanner apparatus 102. However, in a case where, for example, the end processing for the printer apparatus 104 requires a lengthy time period, due to a role of the power supply switch 110 as an emergency power-supply stop switch, the power supply switch 110 stops the power supply to components other than the necessary part for detecting a turn-on state of the power supply switch 110, without completing the entire end processing.

Description of Flowchart According to First Exemplary Embodiment

FIG. 6 is a flowchart according to the present exemplary embodiment illustrating a feature of the present disclosure. Operations according to the present exemplary embodiment are performed in a case where a system end processing event is received (step S502) in the sleep state (step S501). In this procedure, in a case where an estimated printer end processing time is longer than a threshold (step S503), the image forming apparatus 101 is recovered from the sleep state to the active state and information indicating that end processing is in progress is displayed on the operation unit 105 (step S511). This is the difference from the conventional flowchart.

The flowchart in FIG. 6 will be described below. In step S501, in a case where no control is performed by the user for a predetermined time or in a case where the power saving key 610 or a power saving icon is pressed, the CPU 340 shifts from the active state to the sleep state, which is a start of the procedure.

Next, in step S502, the CPU 340 determines whether a system end processing event is received. The system end processing event can be received based on a remote shutdown in which a shutdown event is received from the computer 109 (externally provided) via the LAN 108, a weekly shutdown in which shutdown time for each day of one week is set via the LCD touch panel 600 of the operation unit 105 and a shutdown event is received at the designated time, or an auto-shutdown timer that automatically performs a shutdown in a case where no control is performed by the user for a predetermined time.

In a case where the CPU 340 determines that a system end processing event is received (YES in step S502), the processing proceeds to step S503. In step S503, the CPU 340 determines whether an estimated end processing time for the printer apparatus 104 is longer than a threshold time. In a case where the end processing for the printer apparatus 104 is longer than the threshold time (YES in step S503), a notification is transmitted to the power supply control unit 303. The power supply control unit 303 turns on the power supply switch (Q) 311 and supplies power to the operation unit 105. Consequently, in step S511, the CPU 340 displays an end processing screen. The estimated end processing time for the printer apparatus 104 can be a predetermined time or a time calculated by the CPU 221 based on the number of rotations of a fan for cooling and/or the current temperature of the printer apparatus 104. Alternatively, when the printer apparatus 104 starts preparing for printing, a flag is set, and whether a flag is set can be checked in step S503. In a case where a flag is set (YES in step S503), the processing proceeds to step S511, whereas in a case where no flag is set (NO in step S503), the processing proceeds to step S521.

Next, in step S512, the CPU 340 performs end processing for the printer apparatus 104. In step S513, the CPU 340 turns off the power supply switch 110 and blinks the power supply tally light 619. In step S514, the CPU 340 performs end processing for the controller 103. A case where the end processing for the printer apparatus 104 has already been started when shifting from the standby state to the sleep state is performed in step S501 will be described below. In this case, determination of whether the remaining time of the end processing for the printer apparatus 104 is longer than the threshold time can be performed in step S503, and the already-started end processing for the printer apparatus 104 can be continued in steps S512 and S522.

The end processing for the printer apparatus 104 includes fan rotation control for releasing heat to lower the temperature of the printer apparatus 104 and fan control for discharging ozone in the printer apparatus 104. The end processing for the printer apparatus 104 further includes the rotary drum separation operation for preventing image streaks by the rotary drum of the marking unit 141 for image fixing and control for closing the shutter to prevent the rotary drum of the marking unit 141 from drying.

The end processing for the controller 103 includes stopping of job input, a job cancellation, and storing of data from the memory 341 of the controller 103 to the HDD 106.

While the processing of shifting to the end state based on a system end processing event is not limited to shutdowns and can be based on hibernation, suspension, or reboot, such state shifting processing is not relevant here, the description is omitted.

In a case where a system end processing event is received (YES in step S502), in step S503, the CPU 340 determines whether the estimated end processing time for the printer apparatus 104 is longer than the threshold time. In a case where the estimated end processing time for the printer apparatus 104 is shorter than or equal to the threshold time (NO in step S503), the processing proceeds to step S521. In step S521, the CPU 340 turns off the power supply switch 110 and blinks the power supply tally light 619. In step S522, the CPU 340 performs end processing for the printer apparatus 104. In step S514, the CPU 340 performs end processing for the controller 103.

An advantage of the first exemplary embodiment will be described below. According to the present exemplary embodiment, the image forming apparatus 101 starts the processing in a case where a system end processing event is received (step S502) in the sleep state (step S501). In this processing, in a case where the end processing time for the printer apparatus 104 is longer than the threshold (step S503), the image forming apparatus 101 is recovered from the sleep state to the active state and displays the end processing screen on the operation unit 105.

This enables the image forming apparatus 101 to notify the user that system end processing is in progress.

Description of Flowchart According to Second Exemplary Embodiment

In FIG. 7, the image forming apparatus 101 starts processing in a case where a system end processing event is received (step S602) in the sleep state (step S601). According to the first exemplary embodiment, a predetermined condition used at the branch in step S503 is based on whether the printer end processing time is longer than the threshold. According to a second exemplary embodiment in FIG. 7, the predetermined condition is different from the conventional procedure. Specifically, in a case where the end processing time for the printer apparatus 104 is longer than a time to be counted by a power supply stop timer of the power supply switch 110 (YES in step S603), the image forming apparatus 101 is recovered from the sleep state to the active state and displays the end processing screen on the operation unit 105 (step S611).

(Description of Power Supply Switch 110)

The CPU 340 transmits a notification to the power supply control unit 303, and the power supply control unit 303 supplies power to a solenoid of the power supply switch 110, which is a solenoid-attached seesaw switch, to pull the power supply switch 110 in an off-direction, whereby the power supply switch 110 is turned off. In another method, the CPU 340 transmits a notification to the power supply control unit 303, and the power supply control unit 303 controls the power supply switch 110, which is a tactile switch, to be turned off, whereby the power supply switch 110 is turned off. Further, the CPU 340 of the controller 103 detecting an off state of the power supply switch 110 transmits a notification to the operation unit 105 to cause the power supply tally light 619 of the operation unit 105 to blink and change the color. This processing is also realized by the power supply control unit 303 directly controlling the power supply tally light 619 of the operation unit 105 or by the CPU 305 of the operation unit 105 monitoring an off state of the power supply switch 110. However, the processing is not relevant here, the description is omitted.

The power supply switch 110 has a role of emergency stop. Thus, turning off of the power supply switch 110 triggers the power supply control unit 303 to control the power supply switch (L) 313 with multi-value control signals to stop power supply to a temperature rising part of a fixing device included in the marking unit 141 of the printer apparatus 104. Further, turning off of the power supply switch 110 triggers the power supply control unit 303 to control the power supply switch (R) 312 with multi-value control signals and control the scanner apparatus 102. This processing stops a power supply to a motor of the scanner unit 122 of the scanner apparatus 102, the power supplying being for exciting the motor, rotating the motor, and controlling a position of a scan light source. Units to be stopped in an emergency differ in accordance with the configuration of the image forming apparatus 101 and are therefore not limited to those described above. Because the different configuration is not relevant where, the description is omitted.

(Power Supply Switch 110 and Power Supply Stop Timer)

The power supply switch 110 has a role of stopping the power supply to the image forming apparatus 101 after a lapse of a predetermined time, such as several tens of seconds, and includes the power supply stop timer as a means for realizing the role. Specifically, turning off of the power supply switch 110 triggers the power supply control unit 303 to receive a signal notification and the power supply stop timer starts counting by measuring a predetermined time based on input clock signals. After a lapse of the predetermined time, the power supply control unit 303 turns off the power supply switch (P) 310 and stops the power supply to the controller 103. Simultaneously, the power supply control unit 303 turns off the power supply switch (R) 312 and stops the power supply to the scanner apparatus 102 and also turns off the power supply switch (R) 312 and stops the power supply to the printer apparatus 104. Simultaneously, the power supply control unit 303 turns off the power supply switch (Q) 311 and stops the power supply to the operation unit 105 and also stops the power supply to each unit of the image forming apparatus 101 by using power supply switches (not illustrated).

In another method, turning off of the power supply switch 110 triggers the CPU 340 of the controller 103 to receive an interruption signal from the power supply control unit 303. Then, the CPU 340 sets a designated time for detecting a lapse of the predetermined time to the RTC 212 and the power supply stop timer starts counting. At the designated time, the CPU 340 receives an interruption signal from the RTC 212 and stops the power supply to each unit of the image forming apparatus 101 described above using the power supply control unit 303. While, in this processing, the RTC 212 can transmit a signal notification directly to the power supply control unit 303, this configuration is not relevant here, the description is omitted.

Alternatively, turning off of the power supply switch 110 can trigger a CPU of the printer apparatus 104 to receive a signal, and the power supply stop timer starts counting. However, this configuration is not relevant here, the description is omitted. Any methods for the power supply stop timer of the power supply switch 110 can be used. Examples of the method include a method in which the CPU 340 of the controller 103 stores the time of the power supply stop timer of the power supply switch 110 in a non-volatile storage apparatus, such as the HDD 106, and a method in which an inquiry about the time of the power supply stop timer of the power supply switch 110 is transmitted to the power supply control unit 303 and the time received from the power supply control unit 303 is stored in the memory 341.

(End Processing for Printer Apparatus 104)

The printer apparatus 104 has a role of cooling and discharging air from a body of the image forming apparatus 101. Thus, in response to receipt of an end notification, the printer apparatus 104 performs end processing involving rotation of the fan, sometimes for about an hour. Specifically, in a case where the CPU 340 of the controller 103 transmits an end notification to the printer apparatus 104, the CPU of the printer apparatus 104 performs end processing for the printer apparatus 104, such as awaiting fan rotation.

Any methods can be used for the end processing time for the printer apparatus 104. Examples of the method include a method in which the CPU 340 of the controller 103 stores the end processing time for the printer apparatus 104 in a non-volatile storage apparatus, such as the HDD 106, and a method in which an inquiry about the end processing time for the printer apparatus 104 is transmitted to the CPU of the printer apparatus 104 and the end processing time received from the CPU of the printer apparatus 104 is stored in the memory 341.

(Description of Flowchart)

The flowchart in FIG. 7 will be described below. Differences from the flowchart in FIG. 6 according to the first exemplary embodiment will be described below and the redundant description is omitted.

In step S603, in a case where the end processing time for the printer apparatus 104 is longer than the time to be counted by the power supply stop timer of the power supply switch 110 of the power supply control unit 303 (YES in step S603), the processing proceeds to step S611. In step S611, the image forming apparatus 101 is recovered from the sleep state to the active state and displays the end processing screen on the operation unit 105. On the other hand, in a case where the end processing time for the printer apparatus 104 is equal to or shorter than the time to be counted by the power supply stop timer of the power supply switch 110 of the power supply control unit 303 (NO in step S603), the processing proceeds to step S621. In step S621, the power supply switch 110 is turned off, and the power supply tally light 619 is blinked.

An advantage of the second exemplary embodiment will be described below.

According to the present exemplary embodiment, the image forming apparatus 101 starts the above described processing in response to receipt of an end processing event (step S602) in the sleep state (step S601). In this processing, in a case where the end processing time for the printer apparatus 104 is longer than the time to be counted by the power supply stop timer of the power supply switch 110 (YES in step S603), the image forming apparatus 101 is recovered from the sleep state to the active state and displays the end processing screen on the operation unit 105. This enables the image forming apparatus 101 to notify the user that system end processing is in progress.

According to various embodiments of the present disclosure, in a case where a system end processing event is received in a sleep state, an image forming apparatus is recovered from the sleep state, turns on an operation unit, and displays information indicating that end processing is in progress. This enables the image forming apparatus to notify a user that end processing is in progress.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-108918, filed Jul. 6, 2022, which is hereby incorporated by reference herein in its entirety.

What is claimed is:

1. An image forming apparatus having one or more controllers including one or more processors and one or more memories, the one or more controllers being configured to perform operations including:
controlling the image forming apparatus to shift to at least a first power state and a second power state lower in power than the first power state,
wherein, an operation unit is turned on in response to receipt of a notification for performing termination processing of the image forming apparatus when the image forming apparatus is in the second power state, the second power state being one in which the operation unit is turned off, and
wherein when an estimated processing time for performing termination processing is longer than a threshold time period, the one or more controllers turn on the operation unit, in response to receipt of the notification when the image forming apparatus is in the second power state.

2. The image forming apparatus according to claim 1, wherein the one or more controllers display, on the operation unit in a turned on state, information indicating that the end processing is in progress.

3. The image forming apparatus according to claim 1, wherein the one or more controllers turn on the operation unit when the image forming apparatus is in the first power state and the one or more controllers turn off the operation unit when the image forming apparatus is in the second power state.

4. The image forming apparatus according to claim 1, wherein in a case where an estimated processing time is equal to or shorter than a threshold time period, the one or more controllers do not turn on the operation unit, in response to receipt of the notification by the reception unit when the image forming apparatus is in the second power state.

5. The image forming apparatus according to claim 1, wherein the processing time of the processing unit is a predetermined processing time.

6. The image forming apparatus according to claim 1, wherein the processing time of the processing unit is an end processing time calculated based on a situation of the image forming apparatus.

7. The image forming apparatus according to claim 1, wherein, in response to receipt of the notification when the image forming apparatus is in the second power state, the one or more controllers turn on the operation unit by shifting a power state of the image forming apparatus from the second power state to the first power state.

8. The image forming apparatus according to claim 1,
wherein the end processing includes first end processing that is triggered to be started by receipt of the notification, and second end processing that is started in response to a power supply switch being turned off, and
wherein after completion of the first end processing, the power supply switch is turned off.

9. The image forming apparatus according to claim 8,
wherein the image forming apparatus includes at least a controller and a printer unit, and
wherein the first end processing is end processing of the printer unit, and the second end processing is end processing of the controller.

10. The image forming apparatus according to claim 8, further comprising:
a notification unit using a tally light,
wherein, during the second end processing, the notification unit provides a notification indicating that the end processing is in progress.

11. The image forming apparatus according to claim 10, wherein the notification unit turns on the tally light during the second end processing.

12. The image forming apparatus according to claim 10, wherein the notification unit turns off the tally light during the first end processing.

13. The image forming apparatus according to claim 8,
wherein the power supply switch is configured to stop a power supply after a predetermined time period, and
wherein, in a case where an estimated processing time of the processing unit is longer than the predetermined time period, the one or more controllers turn on the operation unit, in response to receipt of the notification when the image forming apparatus is in the second power state.

14. A method for controlling an image forming apparatus having a first power state and a second power state lower in power than the first power state,
the image forming apparatus including an operation unit that is turned on in the first power state and is turned off in the second power state, and
the method comprising:
receiving a notification for end processing of the image forming apparatus; and
performing, in response to receipt of the notification, the end processing of the image forming apparatus,
wherein, in response to receipt of the notification when the image forming apparatus is in the second power state, the operation unit is turned on based on a predetermined condition, and
wherein when an estimated processing time for performing termination processing is longer than a threshold time period, the one or more controllers turn on the operation unit, in response to receipt of the notification when the image forming apparatus is in the second power state.

* * * * *